(12) United States Patent
McQuarrie

(10) Patent No.: US 10,496,799 B1
(45) Date of Patent: Dec. 3, 2019

(54) AUTOMATED REGISTRATION AND LICENSING TOOL

(75) Inventor: Michael Scott McQuarrie, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1846 days.

(21) Appl. No.: 11/782,516

(22) Filed: Jul. 24, 2007

(51) Int. Cl.
*H04M 1/66* (2006.01)
*G06F 21/10* (2013.01)
*H04L 29/06* (2006.01)

(52) U.S. Cl.
CPC ...... *G06F 21/105* (2013.01); *H04L 29/06823* (2013.01); *H04L 29/06857* (2013.01)

(58) Field of Classification Search
CPC ....................................................... G06F 17/60
USPC ........................................................ 705/1–79
See application file for complete search history.

(56) References Cited

U.S. PATENT DOCUMENTS

| | | | |
|---|---|---|---|
| 5,768,382 A | 6/1998 | Schneier et al. | |
| 6,260,141 B1 * | 7/2001 | Park | 713/155 |
| 6,286,041 B1 | 9/2001 | Collins, III et al. | |
| 6,664,978 B1 | 12/2003 | Kekic et al. | |
| 6,964,051 B1 * | 11/2005 | Palaniappan | 719/317 |
| 6,983,262 B1 | 1/2006 | Ito | |
| 7,003,546 B1 * | 2/2006 | Cheah | 709/200 |
| 7,149,705 B1 | 11/2006 | Haruki et al. | |
| 7,278,106 B1 | 10/2007 | Mason | |
| 7,280,830 B2 * | 10/2007 | Anderson et al. | 455/435.1 |
| 7,594,258 B2 | 9/2009 | Mao et al. | |
| 7,653,722 B1 | 1/2010 | Krishna et al. | |
| 7,853,943 B2 | 11/2010 | McCaleb et al. | |
| 2001/0025245 A1 | 9/2001 | Flickinger et al. | |
| 2002/0094487 A1 | 7/2002 | Day et al. | |
| 2002/0161833 A1 | 10/2002 | Niven et al. | |
| 2003/0018714 A1 * | 1/2003 | Mikhailov et al. | 709/203 |
| 2003/0041240 A1 * | 2/2003 | Roskind et al. | 713/168 |
| 2003/0110368 A1 | 6/2003 | Kartoz | |
| 2003/0149573 A1 * | 8/2003 | Lynton | G06Q 30/012 705/302 |
| 2004/0139049 A1 * | 7/2004 | Hancock et al. | 707/1 |

(Continued)

OTHER PUBLICATIONS

Technology Brief. "Mac OS X Server: Network Install." Apple. Mar. 2005, p. 1-4. (Year: 2005).*

(Continued)

*Primary Examiner* — Samica L Norman
*Assistant Examiner* — Murali K Dega
(74) *Attorney, Agent, or Firm* — Fish & Richardson P.C.

(57) ABSTRACT

Methods and systems are disclosed for managing registrations of computers. The methods and systems provide a registration tool that may be used to automatically register the computers. For each computer to be registered, information uniquely identifying the computer is collected and sent to a remote registration server. The information is then used by the remote registration server to perform the registration on behalf of the computer. The registration may be with a software vendor, a third-party database, or with the remote registration server itself in some cases. The registration server thereafter returns a registration code or other information to the computer to complete the registration. Such an arrangement allows the registration process to be controlled from a central location.

21 Claims, 8 Drawing Sheets

(56) References Cited

U.S. PATENT DOCUMENTS

| | | | |
|---|---|---|---|
| 2004/0163020 | A1 | 8/2004 | Sidman |
| 2005/0132166 | A1* | 6/2005 | Saffre ............................ 712/26 |
| 2005/0149759 | A1 | 7/2005 | Vishwanath et al. |
| 2005/0277412 | A1* | 12/2005 | Anderson et al. ......... 455/435.1 |
| 2006/0265337 | A1* | 11/2006 | Wesinger, Jr. .................. 705/65 |
| 2007/0027925 | A1* | 2/2007 | Spencer et al. ............ 707/104.1 |
| 2007/0038573 | A1* | 2/2007 | Kanchwala et al. ........... 705/58 |
| 2007/0198429 | A1* | 8/2007 | Coley et al. .................... 705/59 |
| 2007/0255808 | A1 | 11/2007 | Kalis |
| 2008/0089493 | A1 | 4/2008 | Booton |
| 2008/0195857 | A1* | 8/2008 | Douillet ........................ 713/150 |
| 2009/0075642 | A1 | 3/2009 | Rantapuska et al. |
| 2009/0178127 | A1 | 7/2009 | Ogino et al. |
| 2009/0239502 | A1* | 9/2009 | Dempo .............. H04L 12/4011 455/411 |

OTHER PUBLICATIONS

Technology Brief. "Mac OS X Server: Network Install." Apple. Mar. 2005, p. 1-4.

Lederhos, M. "Electronic Software Distribution . . . One Piece of a Much Bigger Picture." Strategies, SoftwareBusinessOnline.com, May/Jun. 2004, p. 1-2.

Thio, C., Iqbal, M., Puri, R., Guy, S., and Gucer, V. "Best Practices and Methodology for Electronic Software Distribution and Operating System Provisioning in an on Demand Business." IBM Redbooks, Nov. 2006, p. 1-210.

Business Wire. "Black Duck Software Expands Integration of protexIP/development 4.0 in Ready for IBM Rational Software Validation Program." Technology Marketing Corporation, Dec. 5, 2006 [retrieved from the Internet on Jan. 14, 2008 using <URL: http://www.tmcnet.com/usubmit/2006/12/05/2137561.htm>].

Business Wire. "Sassafras Simplifies Software Auditing & License Management; K2 Version 6.1 Simplifes Software License Compliance and Usage Tracking by Automatically Sorting Application Programs into Categories." Gale Group, Sep. 14, 2005. [retrieved from the Internet on Jan. 14, 2008 using <URL: http://sassafras.com/pr/k2v61.html>].

Cisco Systems, Inc. "How Licensing and Software Work in Cisco Unified Call Studio." Cisco Systems, Inc., Jun. 26, 2007.

Riley, M. "A Special Guide to DRM and Software Activation Tools: Protect Data, Enforce Licenses." Software Development, Feb. 1, 2006. [retrieved from the Internet on Jan. 14, 2008 using <URL: http://www.ddj.com/security/1844154715>].

* cited by examiner

AUTOMATED REGISTRATION AND LICENSING TOOL

CROSS-REFERENCE TO RELATED APPLICATIONS

This application is related in subject matter to, and incorporates herein by reference in its entirety, each of the following: U.S. patent application Ser. No. 11/782,501, entitled "Automated Registration and Licensing Tool," filed on Jul. 24, 2007, now U.S. Pat. No. 7,917,605 B1; and U.S. patent application Ser. No. 11/782,513, entitled "Automated Registration and Licensing Tool," also filed on Jul. 24, 2007, now abandoned.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The disclosed embodiments relate generally to registration of computers and/or software applications running on those computers. More specifically, the disclosed embodiments relate to systems and methods for automatically performing the registrations.

BACKGROUND

Many software applications, particularly administrative tools that are deployed on one computer to configure other computers, require the computers that use the applications to be registered. Such registration serves several purposes, such as ensuring that the user (or his/her company) has obtained a legitimate copy of the software application. Registration also helps track compliance with software licenses that govern, for example, the number of users or computers permitted to use the software applications. For readability purposes, the term "registration" refers to both registration and licensing throughout this description, although in practice they may have somewhat different meanings.

Presently, registration is largely a manual process performed on a computer-by-computer basis. That is, the user must perform the registration from each computer, usually by executing a vendor-supplied registration utility. The registration utility typically requires the user to provide certain information about the computer that the utility then transmits to the vendor over the Internet. In the case of an administrative tool, the computers may additionally, or alternatively, be required to register with a control module of the administrative tool on a company server. In some cases, the user may also need to supply information over the telephone (typically through a 1-800 number). The vendor and/or the control module thereafter returns a registration code or similar information that the user may then use to complete the registration.

As can be seen from the foregoing, existing registration processes are tedious and time-consuming, particularly if there is a large number of computers (one company may have hundreds or thousands of computers). Moreover, while Internet registration is convenient, some vendor registration utilities require the computer to have direct communication with the vendor Web sites, meaning a separate network port and firewall must be set up on those computers (in addition to any firewall already set up on the network gateway). This raises a number of security issues and creates additional work for technical support personnel. Finally, from a licensing compliance perspective, it is often difficult to track which computers have been registered and which ones have not when the registration is performed separately on each computer.

Accordingly, what is needed is a way to automate the existing registration process. More particularly, what is needed is a way to centralize the registration process so that it may be more easily controlled and managed.

SUMMARY

The disclosed embodiments are directed to methods and systems for managing registrations of computers. The methods and systems provide a registration tool that may be used to automatically register the computers. For each computer to be registered, information uniquely identifying the computer is collected and sent to a remote registration server. The information is then used by the remote registration server to perform the registration on behalf of the computer. The registration may be with a software vendor, a third-party database, or with the remote registration server itself in some cases. The registration server thereafter returns a registration code or other information to the computer to complete the registration. Such an arrangement allows the registration process to be controlled from a central location.

BRIEF DESCRIPTION OF THE DRAWINGS

The foregoing and other advantages of the invention will become apparent from the following detailed description and upon reference to the drawings, wherein.

DETAILED DESCRIPTION

Figure 1:
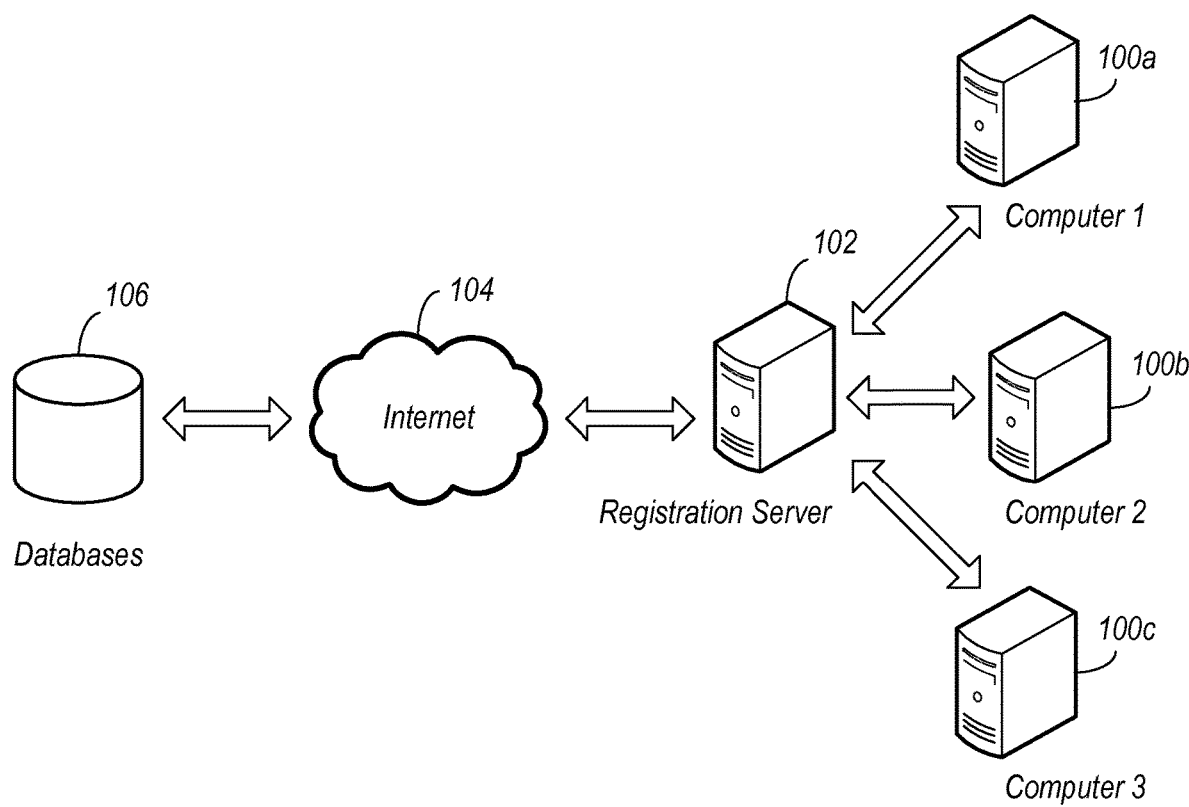
FIG. 1 illustrates an exemplary process for automatically registering computers according to the disclosed embodiments.

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial embodiment of the inventions are described or shown for the sake of clarity and understanding.

Persons of skill in this art will also appreciate that the development of an actual commercial embodiment incorporating aspects of the inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the embodiments disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the invention or the appended claims.

Particular embodiments are now described with reference to block diagrams and/or operational illustrations of methods. It should be understood that each block of the block diagrams and/or operational illustrations, and combinations of blocks in the block diagrams and/or operational illustrations, may be implemented by analog and/or digital hardware, and/or computer program instructions. Computer program instructions for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system.

The executed instructions may also create structures and functions for implementing the actions specified in the mentioned block diagrams and/or operational illustrations. In some alternate implementations, the functions/actions/ structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

Referring now to FIG. 1, a plurality of computers 100a, 100b, and 100c are shown, each having one or more software applications deployed thereon and/or remotely configurable by one or more software applications. The computers 100a-c are typically connected to a private network, such as the internal networks found in many corporations, government agencies, educational institutions, and the like. These computers 100a-c may be any suitable computers known to those having ordinary skill in the art, including personal computers, servers, workstations, mainframes, and the like. Similarly, the software applications deployed on the computers 100a-c may include any applications known to those having ordinary skill in the art, including word processors, web browsers, image editors, databases, and the like. Where the software application is an administrative tool, the main application itself usually resides on a central server and only certain modules or agents of the software application, if any, are deployed on the computers 100a-c. These software applications may be publicly-available applications developed by commercial software vendors (e.g., Microsoft, IBM, Oracle, etc.), or they may be proprietary applications custom-developed by company personnel.

As alluded to earlier, many software applications, particularly administrative tools, require users to register their computers with the vendors of the software application. This typically involves manually submitting identification information from the computers 100a-c to the software application vendors, the software applications themselves for a software application where the main application resides on a central server, or both.

In accordance with the disclosed embodiments, instead of manually performing the registration for each computer 100a-c, a remote registration server 102 is provided that automatically performs the registrations on behalf of the computers 100a-c. That is, the remote registration server 102 performs all the steps needed for registration of the computers 100a-c, but in a way that appears to a registrar as if the computers 100a-c themselves are performing the registration. Moreover, the registration is performed independently of any software application used with or by the computers 100a-c (i.e., the software application does not control the registration).

In the embodiments shown, the remote registration server 102 is connected to the computers 100a-c over the same private network and is additionally connected to a public network 104, such as the Internet, through a secure network gateway (not expressly shown). This allows the registration server 102 to safely communicate directly with one or more software vendors, third-party databases (e.g., domain name servers), and the like, in order to perform the registrations. The vendors, third-party databases, and the like, are shown generally in FIG. 1 as one or more external databases 106. As a result, there is no necessity to access the external databases 106 directly from the computers 100a-c for registration purposes, thereby greatly simplifying network configurations and alleviating network security concerns.

Figure 2:
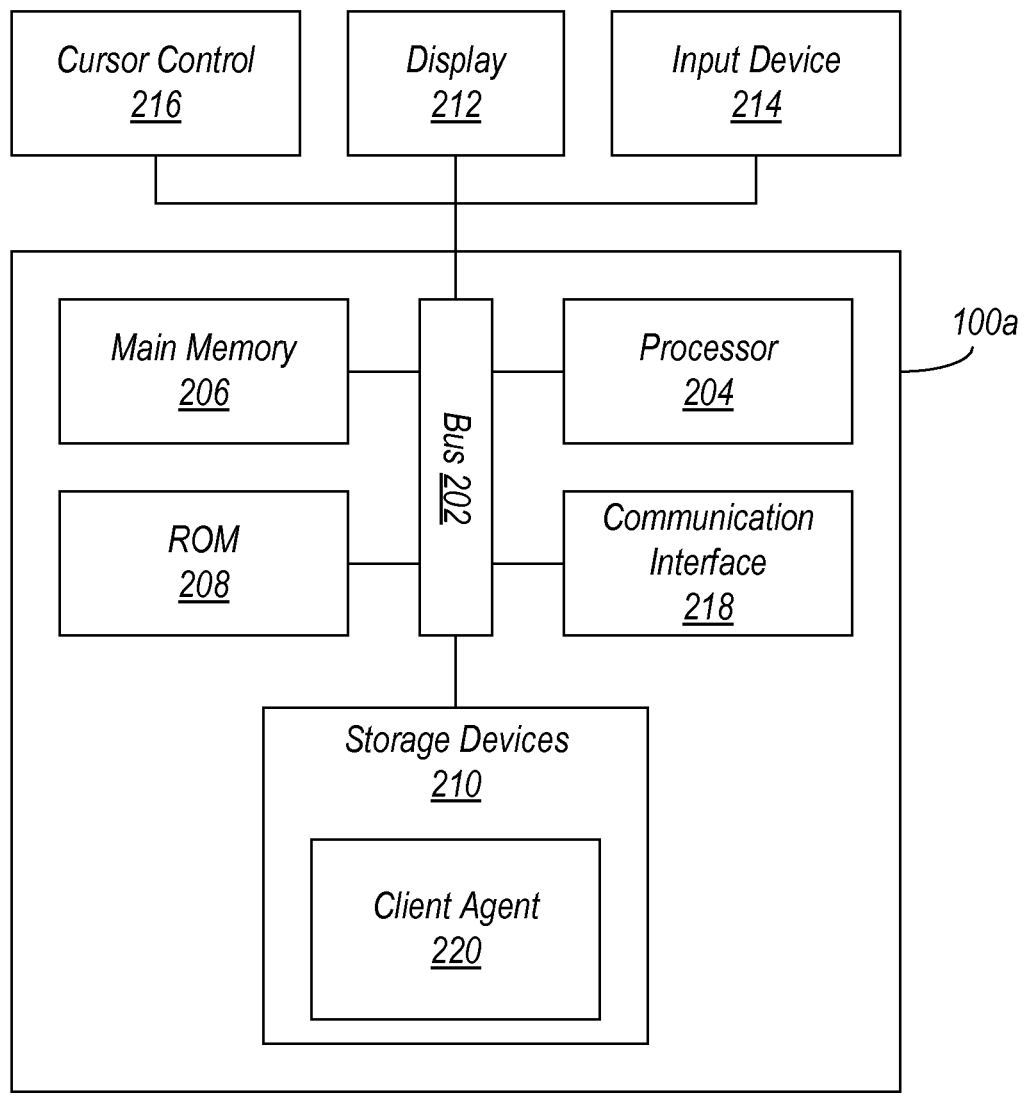
FIG. 2 illustrates an exemplary computer capable of automatic registration according to the disclosed embodiments.

FIG. 2 illustrates one of the computers 100a-c in more detail according to the disclosed embodiments, specifically the first computer 100a (the other computers 100b-c may be the same or similar to the first computer 100a and therefore will not be described in detail). Any suitable computer known to those having ordinary skill in the art may be used as the computer 100a, including a personal computer, workstation, server, mainframe, and the like. Such a computer 100a typically includes a bus 202 or other communication mechanism for communicating information and a processor 204 coupled with the bus 202 for processing information. The computer 100a may also include a main memory 206, such as a random access memory (RAM) or other dynamic storage device, coupled to the bus 202 for storing computer-readable instructions to be executed by the processor 204. The main memory 206 may also be used for storing temporary variables or other intermediate information during execution of the instructions to be executed by the processor 204. The computer 100a may further include a read only memory (ROM) 208 or other static storage device coupled to the bus 202 for storing static information and instructions for the processor 204. A computer-readable storage device 210, such as a magnetic disk or optical disk, may be coupled to the bus 202 for storing information and instructions for the processor 204.

The computer 100a may be coupled via the bus 202 to a display 212, such as a cathode ray tube (CRT), for displaying information to a user. An input device 214, including, for example, alphanumeric and other keys, may be coupled to the bus 202 for communicating information and command selections to the processor 204. Another type of user input device may be a cursor control 216, such as a mouse, a trackball, or cursor direction keys for communicating direction information and command selections to the processor 204, and for controlling cursor movement on the display 212. The cursor control 216 typically has two degrees of freedom in two axes, a first axis (e.g., X axis) and a second axis (e.g., Y axis), that allow the device to specify positions in a plane.

The term "computer-readable instructions" as used above refers to any instructions that may be performed by the processor 204 and/or other components. Similarly, the term "computer-readable medium" refers to any storage medium that may be used to store the computer-readable instructions. Such a medium may take many forms, including, but not limited to, non volatile media, volatile media, and transmission media. Non volatile media may include, for example, optical or magnetic disks, such as the storage device 210. Volatile media may include dynamic memory, such as main memory 206. Transmission media may include coaxial cables, copper wire and fiber optics, including wires of the bus 202. Transmission media may also take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer-readable media may be involved in carrying one or more sequences of one or more instructions to the processor 204 for execution. For example, the instructions may initially be borne on a magnetic disk of a remote computer. The remote computer can load the instructions into its dynamic memory and send the instructions over a telephone line using a modem. A modem local to the computer 100a can receive the data on the telephone line and use an infrared transmitter to convert the data to an infrared signal. An infrared detector coupled to the bus 202 can receive the data carried in the infrared signal and place the data on the bus 202. The bus 202 carries the data to the main memory 206, from which the processor 204 retrieves and executes the instructions. The instructions received by the main memory 206 may optionally be stored on the storage device 210 either before or after execution by the processor 204.

The computer 100a may also include a communication interface 218 coupled to the bus 202. The communication interface 218 typically provides a two way data communication coupling between the computer 100a and the network 104. For example, the communication interface 218 may be an integrated services digital network (ISDN) card or a modem used to provide a data communication connection to a corresponding type of telephone line. As another example, the communication interface 218 may be a local area network (LAN) card used to provide a data communication connection to a compatible LAN. Wireless links may also be implemented. Regardless of the specific implementation, the main function of the communication interface 218 is to send and receive electrical, electromagnetic, optical, or other signals that carry digital data streams representing various types of information.

In accordance with the disclosed embodiments, a client agent 220, or rather the computer-readable instructions therefor, may reside on the storage device 210. The client agent 220 may then be executed automatically or manually from the registration server 102 to facilitate automatic registration of the computer 100a. In general, the client agent 220 functions to collect information about the computer 100a that may be used to register the computer 100a. The client agent 220 then transmits this information to the registration server 102 along with a request to register the computer 100a. The client agent 220 thereafter waits for confirmation from the registration server 102 that the registration has been successfully completed before terminating. Following is a description of an exemplary implementation of the client agent 220 according to the disclosed embodiments.

Figure 3:
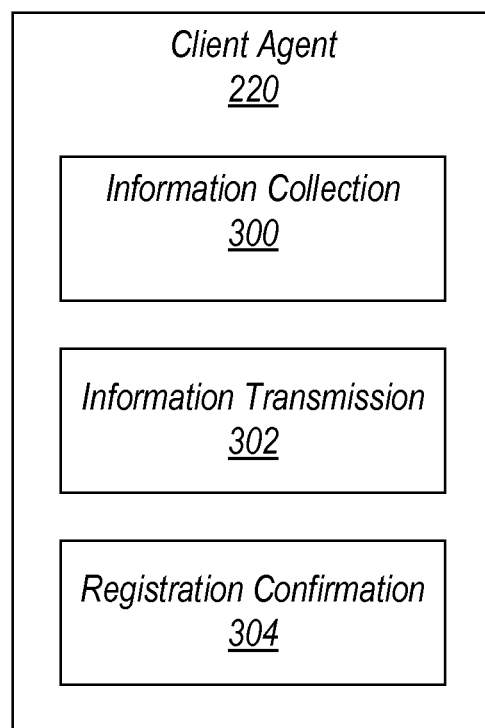
FIG. 3 illustrates an exemplary client agent for automatically registering the computer according to the disclosed embodiments.

Referring to FIG. 3, in one embodiment, the client agent 220 comprises a number of functional components, including an information collection module 300, an information transmission module 302, and a registration confirmation module 304. These functional components 300-304 may be implemented using any suitable programming language known to those having ordinary skill in the art, including Perl, C, Java, and the like. In some embodiments, the client agent 220 may also be implemented using a scripting language, such as REXX (REstructured eXtended eXecutor), JavaScript, Visual Basic Script, and so forth. Note that although the various functional components 300-304 of the client agent 220 have been shown in discrete units in FIG. 3, those having ordinary skill in the art will understand that two or more of these components may be combined into a single component, and that any individual component may be divided into several constituent components, without departing from the disclosed embodiments.

In general, the information collection module 300 is responsible for collecting information that can uniquely identify the computer 100a for registration purposes. Such information may include, for example, the computer name, serial number, and/or IP address. In some cases, the information may also include the serial number of the software application, the name of the application's registration utility, and/or the URL of the software vendor. Other information known to does having ordinary skill in the art may also be included without departing from the scope of the disclosed embodiments. The information collection module 300 may collect the above information by reading it from one or more designated files residing on the computer 100a (e.g., in the main memory 206, ROM 208, and/or storage devices 210), including the files of one or more software applications the computer 100a is being registered in connection with. The information collection module 300 may alternatively extract the information from the computer 100a by executing various commands known to those having ordinary skill in the art.

Once the unique registration information is collected, the information transmission module 302 is responsible for sending the information to the registration server 102 along with a request for registration of the computer 100a. The information transmission module 302 may perform this function by sending the information as a binary file, a text file, a data stream, and the like, using any suitable protocol, such as File Transfer Protocol (FTP), Hypertext Transfer Protocol, Real Time Streaming Protocol (RTSP), and so forth. In accordance with embodiments of the invention, the information transmission module 302 sends the collected information to the registration server 102 over the private network. More specifically, the information transmission module 302 sends this information over a private network port that has been designated ahead of time by system administrators for sending the information. This obviates the need for the computer 100 to be connected directly to the public network 104, such as the Internet, thereby simplifying network configurations and alleviating network security concerns.

The registration confirmation module 304 is responsible for obtaining confirmation that the registration has been successfully completed for the specific computer 100*a* on which the module resides. In one implementation, the registration confirmation module 304 performs this function by monitoring the designated network port for computer-specific registration confirmation from the registration server 102. Upon receiving the above registration confirmation from the registration server 102, the registration confirmation module 304 stores the information and terminates execution on the computer 100*a*. The registration confirmation module 304 may also end if the expected information is not received within a certain amount of time.

In some embodiments, the computer-specific registration confirmation may include information generated by the registration server 102 itself, such as a completion status or similar information. In other embodiments, the registration confirmation may be generated by one of the external databases 106 with which the registration was conducted. Such registration confirmation may serve simply to confirm to the computer 100*a* that the registration process was successfully (or unsuccessfully) completed for that specific computer 100*a*, and/or it may provide information that is needed for proper configuration of the computer 100*a* and/or operation of one or more software applications in connection with the computer 100*a*. In the latter case, the registration confirmation may include a registration code or configuration file that is required to identify the computer 100*a* to a software application, one of the external databases 106, and/or the registration server 102 itself. Where the external database 106 is third-party database, such as a domain name server, the computer-specific registration confirmation may include still other types of information, such as the IP address, network gateway, and/or subnet mask of the computer 100*a*.

Figure 4:
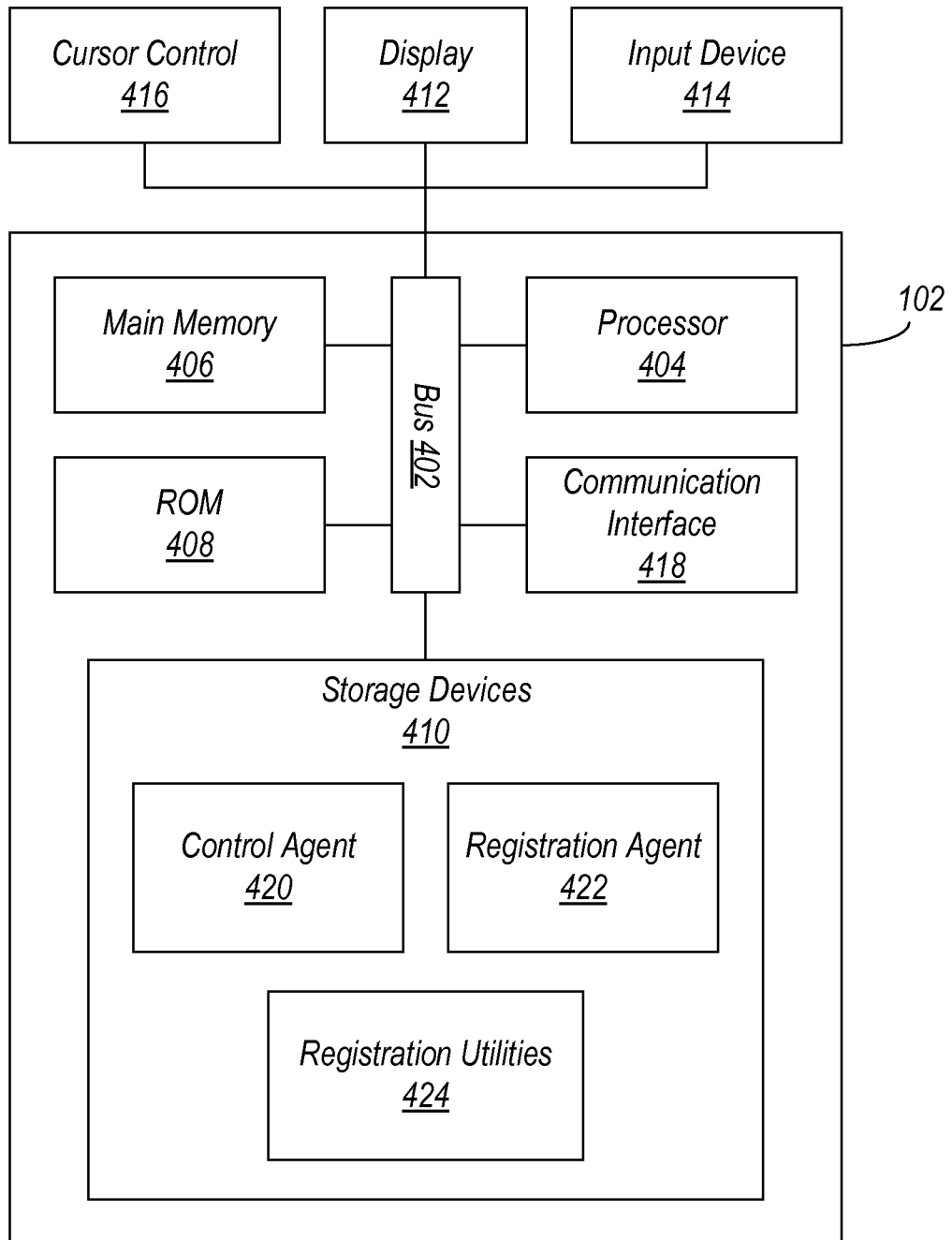
FIG. 4 illustrates an exemplary registration server capable of automatically registering computers according to the disclosed embodiments.

FIG. 4 illustrates an example of the registration server 102 connected to the computers 100*a-c* over the private network, which registration server 102 is also to the public network 104 (e.g., the Internet), according to the disclosed embodiments. In the specific example shown, the registration server 102 has many of the same or similar components as the computers 100*a-c* and, consequently, will not be described in detail here. Any suitable computer known to those having ordinary skill in the art may be used as the registration server 102, including a personal computer, workstation, server, mainframe, and the like.

In accordance with the disclosed embodiments, a control agent 420 and a registration agent 422, or rather the computer-readable instructions therefor, may reside on the storage device 410. The control agent 420 and the registration agent 422 may then be executed, either manually or as part of an automated procedure, to facilitate automatic registration of the computers 100*a-c*. In general, the control agent 420 functions to start, stop, and restart the registration agent 422 based on requests for registrations received from the computers 100*a-c*. The registration agent 422 functions primarily to send the registration information to the external databases 106 and acquire any registration confirmation from the external databases 106 that may be required to complete the registrations. Also present on the storage device 410 are one or more vendor-supplied registration utilities 424 that perform vendor-specific steps for registering with certain ones of the external databases 106. Following is a description of an exemplary implementation of the control agent 420 and registration agent 422 according to the disclosed embodiments.

Figure 5:
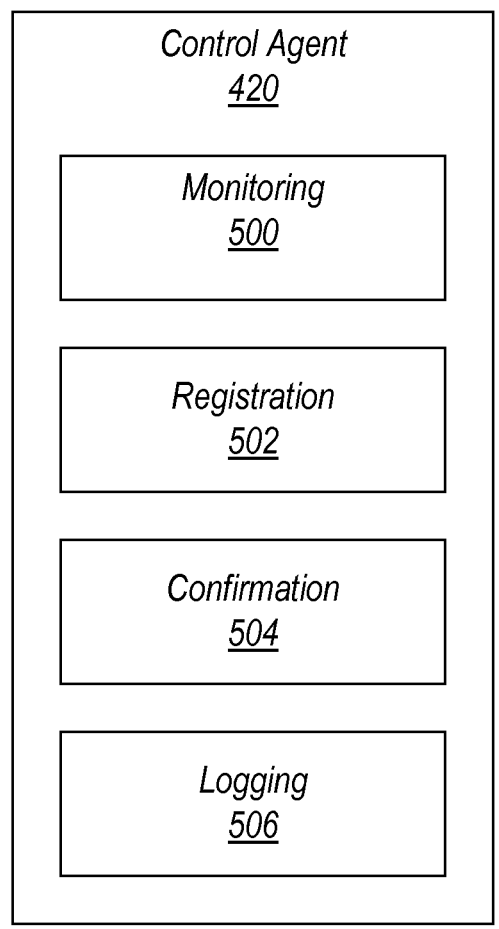
FIG. 5 illustrates an exemplary control agent for managing registration of the computers according to the disclosed embodiments.

Referring to FIG. 5, in one embodiment, the control agent 420 comprises a number of functional components, including a monitoring module 500, a registration module 502, a confirmation module 504, and a logging module 506. As with the client agent in 220, the functional components 500-506 of the control agent 420 may be implemented using any suitable programming and/or scripting language known to those having ordinary skill in the art. Note that although the various functional components 500-506 of the control agent 420 have been shown in discrete units in FIG. 5, those having ordinary skill in the art will understand that two or more of these components may be combined into a single component, and that any individual component may be divided into several constituent components, without departing from the disclosed embodiments.

In general, the monitoring module 500 is responsible for monitoring the private network, specifically the designated network port, for registration requests from the client agents 220 on the computers 100*a-c*. Such registration requests along with the registration information therefore may arrive from the computers 100*a-c* at any time (i.e., asynchronously) and in any suitable format using any suitable protocol known to those having ordinary skill in the art (e.g., binary file, text file, data stream, etc.). The monitoring module 500 thereafter passes the registration requests and the accompanying registration information to the registration module 502 in real time.

Upon receipt of a registration request, the registration module 502 starts the registration agent 422 (unless it is already running), for example, using its process identification (PID) or other similar technique. The registration agent 422, as will be described further below, has the primary responsibility of executing the one or more vendor-supplied registration utilities 424 that perform vendor-specific tasks for registering the computers 100*a-c* with certain ones of the external databases 106. The registration module 502 also obtains, via the registration agent 422, any registration confirmation forthcoming from the external databases 106 as a result of completing the registration and passes that confirmation to the confirmation module 504.

The confirmation module 504 functions primarily to send any registration confirmation from the registration module 502 to the computers 100*a-c*. In accordance with embodiments of the invention, the confirmation module 504 performs this function by sending the registration confirmation over the private network using the designated network port. As mentioned earlier, such registration confirmation may simply confirm that the registration process was successfully (or unsuccessfully) completed, and/or it may provide information that is needed for proper configuration of the computer 100*a* and/or operation of one or more software applications in connection with the computer 100*a-c*. In this way, there is no necessity for the computers 100a-c to directly access the public network 104 for registration purposes, thereby simplifying network configuration and alleviating security concerns.

Finally, the logging module 506 maintains a centralized list of all registrations for all computers 100a-c performed by the registration server 102. The list may include information such as the time and date of the registration, the computer-specific information that was used in the registration (e.g., names, serial numbers, etc.), the timing of renewals (if any), and the like. Such a centralized list makes it easier to keep track of which computers 100a-c have been registered with which external databases 106.

Figure 6:
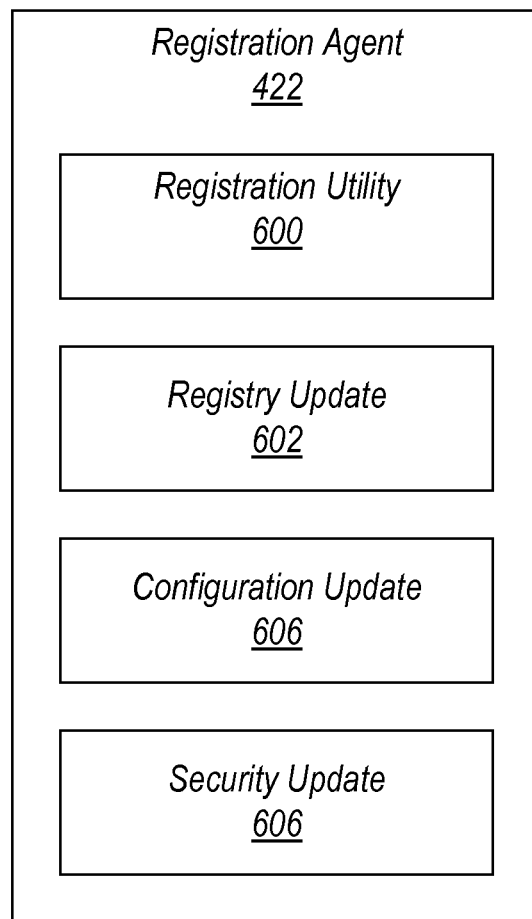
FIG. 6 illustrates an exemplary registration agent for automatically registering computers according to the disclosed embodiments.

FIG. 6 illustrates the registration agent 422 in more detail according to embodiments of the invention. The registration agent 422 is similar to the client agent 220 and control agent 420 insofar as it comprises a number of functional components, including a registration utility module 600, a registry update module 602, a configuration update module 604, and a security update module 606. And as before, these functional components 600-606 of the registration agent 422 may be implemented using any suitable programming and/or scripting language known to those having ordinary skill in the art. Note also that although the various functional components 600-606 of the control agent 420 have been shown in discrete units in FIG. 6, those having ordinary skill in the art will understand that two or more of these components may be combined into a single component, and that any individual component may be divided into several constituent components, without departing from the disclosed embodiments.

In general, the registration utility module 600 is responsible for executing the vendor-supplied registration utilities 424 for the external databases 106. The particular vendor-supplied registration utility 424 executed by the registration utility module 600 depends on which software application (hence, software vendor) the computers 100a-c are being registered in connection with. Thus, a separate registration utility module 600 may be provided for executing a separate registration utility 424 for each software vendor, or a single registration utility module 600 may be provided for executing multiple registration utilities 424 for multiple software vendors. These vendor-supplied registration utilities are generally designed to access a certain URL using a certain protocol, provide certain information to the database 106 located at the URL, and receive certain computer-specific registration confirmation in return from the database 106. In cases where no vendor-supplied registration utility 424 is available (or needed), the registration utility module 600 itself may generate the computer-specific registration confirmation.

For certain administrative software application, a centralized registry is maintained of computers 100a-c that are registered to use or be used by the software application. In accordance with embodiments of the invention, once the registration utility module 600 obtains the computer-specific registration confirmation, it notifies the registry update module 602 that the particular computer 100a-c has been registered. The registry update module 602 thereafter updates the registry of the software application using information contained in the computer-specific registration confirmation (e.g., registration code, configuration file, etc.).

In addition to a registry update, in some embodiments, the configuration of the specific computer 100a-c for which registration was completed is also updated. This is the primary function of the configuration update module 604. In accordance with embodiments of the invention, once the registration utility module 600 obtains the computer-specific registration confirmation, it also notifies the configuration update module 604 that the particular computer 100a-c has been registered. The configuration update module 604 thereafter updates the various configuration properties of the computer for which registration was completed using information contained in the registration confirmation.

Figure 7:
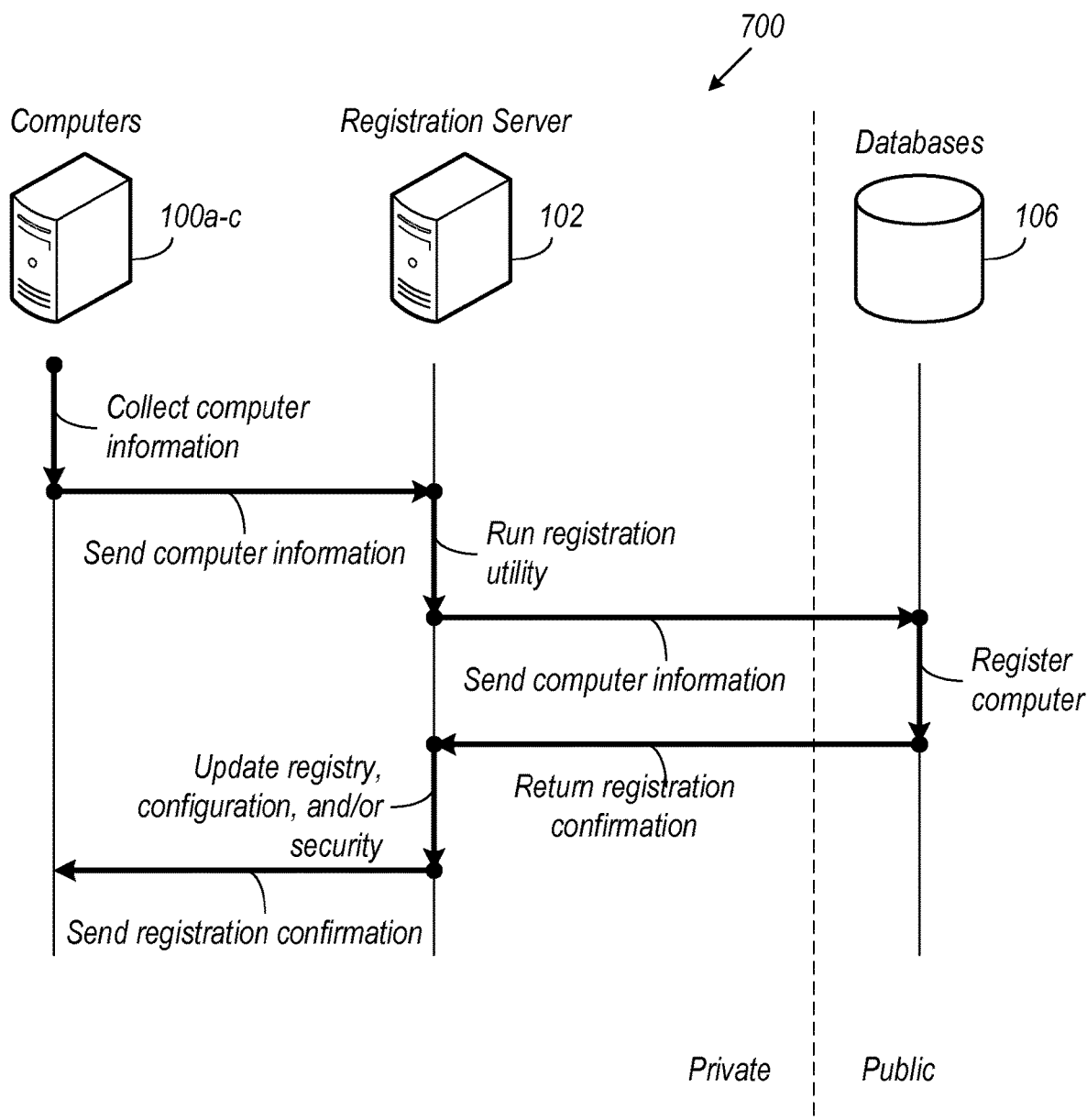
FIG. 7 illustrates an exemplary timing diagram for automatically registering computers according to the disclosed embodiments.
Figure 8:
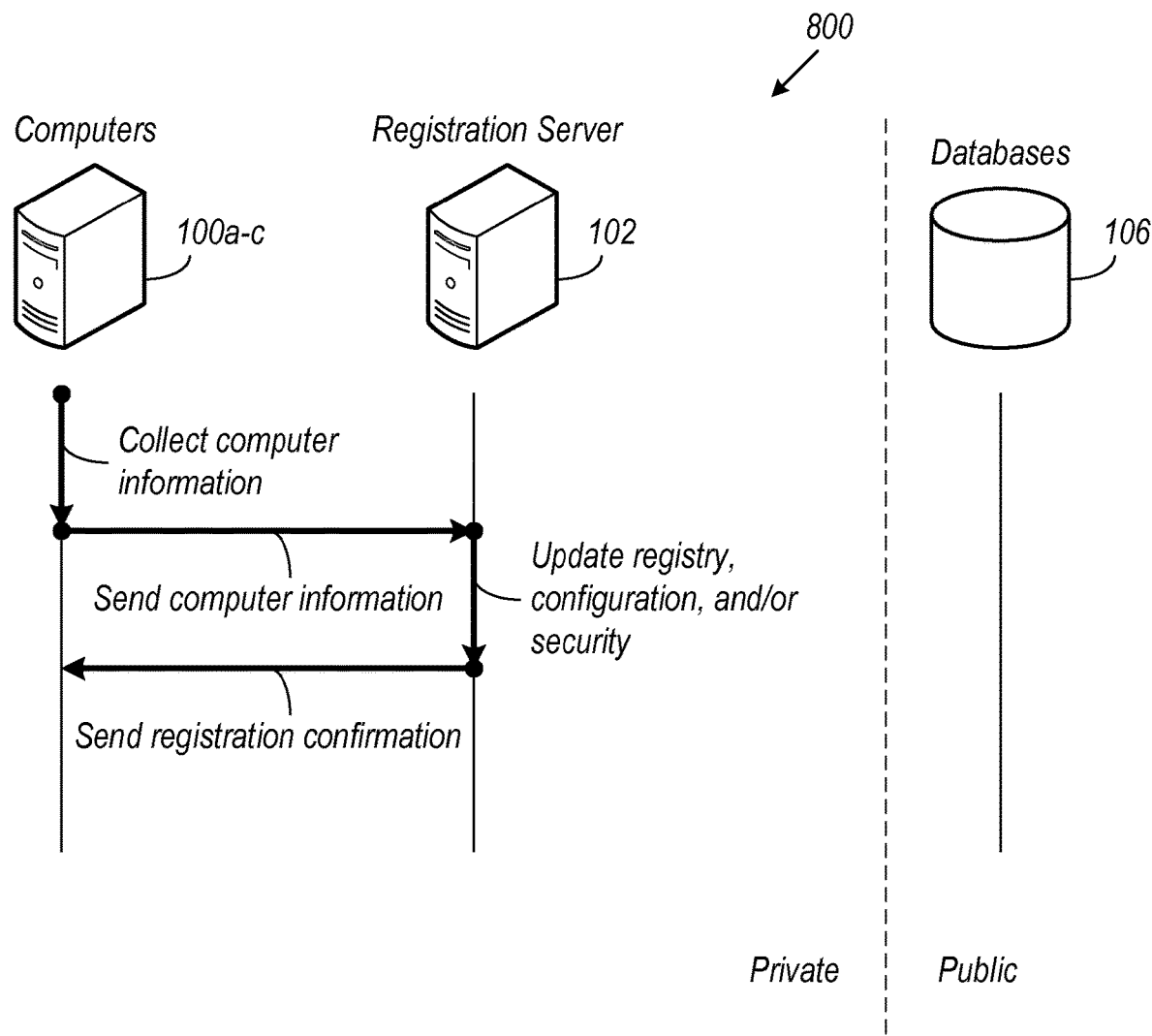
FIG. 8 illustrates another exemplary timing diagram for automatically to registering computers according to the disclosed embodiments.

For security reasons, an access control list (ACL) is also maintained by certain administrative software applications. For example, the administrative tool from BladeLogic uses an access control list to identify which computers 100a-c are registered to use or be used by the administrative tool. Such an access control list may be maintained and updated by the security update module 606. In accordance with embodiments of the invention, once the registration utility module 600 obtains the computer-specific registration confirmation, it further notifies the security update module 606 that the particular computer 100a-c has been registered. The security update module 660 thereafter updates the access control list of the software application with the computer-specific registration using information contained in the registration confirmation. In some embodiments, the security update module 606 also sends the access control list to the specific computer 100a-c that was registered. When Thus far, the disclosed embodiments have been described with respect to a few specific implementations. Following now are general methodologies that may be used in connection with the disclosed embodiments, as described with respect to FIGS. 7-8. It should be noted that although several discrete steps are shown in FIGS. 7-8, those having ordinary skill in the art will understand that one or more of these steps may be combined into a single step, and that any individual step may be divided into several constituent steps as needed without departing from the scope of the disclosed embodiments. Moreover, although the steps in FIGS. 7-8 are arranged in a particular sequence, those having ordinary skill in the art will recognize that one or more of the steps may be performed outside the sequence shown without departing from the scope of the disclosed embodiments.

Referring to FIG. 7, a timing diagram 700 is shown for automatically registering a computer according to the embodiments disclosed herein. As can be seen, the automatic registration process begins by collecting, at each computer 100a-c to be registered, various items of information uniquely identifying the computer 100a-c. This information is subsequently sent from the computer 100a-c to the registration server 102 over the private network (via a designated network port) along with a request for registration. The registration server 102 processes the information and, among other things, executes a vendor-supplied registration utility that performs various vendor-specific tasks related to registration for a specific vendor. The vendor-supplied registration utility uses the public network 104 (e.g., the Internet) to send the computer-specific registration information to the URL of one of the external databases 106 on behalf of the computer 100a-c. This results in the computer 100a-c being registered with that external database 106. The external database 106 thereafter returns registration confirmation, including any registration code or configuration file, to the registration server 102. The registration server 102 makes any registry, configuration, and/or security updates needed, and sends the registration confirmation to the computer 100a-c.

FIG. 8 shows a timing diagram 800 that is similar to the timing diagram 700 of FIG. 7, except that the entire registration process takes place within the private network (i.e., no access to the public network 104 is necessary for registration purposes). Such an arrangement is especially useful in instances where there is no need for a vendor-supplied registration utility to perform the registration in these embodiments. Instead, the registration server 102 itself performs the registration and provides any computer-specific registration confirmation needed. Thus, for example, registrations involving software applications developed internally by company personnel may benefit from the process shown here.

While the disclosed embodiments have been described with reference to one or more particular implementations, those skilled in the art will recognize that many changes may be made thereto. Therefore, each of the foregoing embodiments and obvious variations thereof is contemplated as falling within the spirit and scope of the disclosed embodiments, which are set forth in the following claims.

What is claimed is:

1. A device for registering a plurality of computers of an organization with an external database on behalf of the plurality of computers, the device comprising:
    a memory; and
    a processor coupled to the memory, wherein instructions stored on memory are executed by the processor to:
        monitor a private network to identify a registration request sent from a computer of the plurality of computer, wherein the private network is only available within the organization; and
        in response to identifying the registration request:
            receive, over the private network, from the computer, identification information uniquely identifying the computer;
            initiate a registration of the computer with an external database of a plurality of external databases by providing the identification information over a public network to the external database;
            receive a registration confirmation for the computer from the external database, the registration confirmation being based on the identification information;
            send the registration confirmation to the computer over the private network, the registration confirmation including configuration information for the computer; and
            update a centralized list of registrations for the plurality of computers with the registration confirmation for the computer received from the external database, the centralized list enabling a user to keep track of which computers have been registered with which external databases.

2. The device of claim 1, wherein the registering of the computer is performed asynchronously and in real time.

3. The device of claim 1, wherein the registering of the computer is performed by executing a registration utility provided by the external database.

4. The device of claim 3, wherein the registration utility is configured to send the identification information to the external database, and to receive the computer specific registration confirmation from the external database, over the public network.

5. The device of claim 4, wherein the number of software applications include an administrative tool deployed on a registration server remotely from the plurality of computers.

6. The device of claim 1, wherein the processor is configured to monitor the computer for the identifying information and a registration request.

7. The device of claim 1, wherein the processor is configured to maintain a centralized log of the registration of the computer.

8. A method of registering a plurality of computers with an external database on behalf of the plurality of computers, the method comprising:
    monitoring a private network to identify a registration request sent from a computer of the plurality of computer, wherein the private network is only available within the organization; and
    in response to identifying the registration request:
        receiving, over the private network from the computer, identification information uniquely identifying the computer;
        initiating a registration of the computer with an external database of a plurality of external databases by providing the identification information over a public network to the external database;
        receiving a registration confirmation for the computer from the external database, the registration confirmation being based on the identification information;
        sending the registration confirmation to the computer over the private network, the registration confirmation including configuration information for the computer; and
        updating a centralized list of registrations for the plurality of computers with the registration confirmation for the computer received from the external database, the centralized list enabling a user to keep track of which computers have been registered with which external databases.

9. The method of claim 8, wherein the registering of the computer is performed asynchronously and in real time.

10. The method of claim 8, wherein the registering of the computer is performed by executing a registration utility provided by the external database.

11. The method of claim 10, wherein the registration utility is configured to send the identification information to the external database, and to receive the computer specific registration confirmation from the external database, over the public network.

12. The method of claim 8, wherein the number of software applications include an administrative tool deployed on a registration server remotely from the plurality of computers.

13. The method of claim 8, further comprising monitoring the computer for the identifying information and a registration request.

14. The method of claim 8, further comprising maintaining a centralized log of the registration of the computer.

15. A non-transitory computer-readable medium encoded with computer-readable instructions for registering a plurality of computers with an external database on behalf of the plurality of computers, the computer-readable instructions comprising instructions for causing one or more processing devices to:
    monitor a private network to identify a registration request sent from a computer of the plurality of computer, wherein the private network is only available within the organization; and
    in response to identifying the registration request:
        receive, over the private network from the computer, identification information uniquely identifying the computer;
        initiate a registration of the computer with an external database of a plurality of external databases by providing the identification information over a public network to the external database;

receive a registration confirmation for the computer from the external database, the registration confirmation being based on the identification information;

send the registration confirmation to the computer over the private network, the registration confirmation including configuration information for the computer; and update a centralized list of registrations for the plurality of computers with the registration confirmation for the computer received from the external database, the centralized list enabling a user to keep track of which computers have been registered with which external databases.

16. The computer-readable medium of claim 15, wherein the registering of the computer is performed asynchronously and in real time.

17. The computer-readable medium of claim 15, wherein the registering of the computer is performed by executing a registration utility provided by the external database.

18. The computer-readable medium of claim 17, wherein the registration utility is configured to send the identification information to the external database, and to receive the computer-specific registration confirmation from the external database, over the public network.

19. The computer-readable medium of claim 15, wherein the number of software applications include an administrative tool deployed on a registration server remotely from the plurality of computers.

20. The computer-readable medium of claim 15, further comprising computer readable instructions for monitoring the computer for the identifying information and a registration request.

21. The computer-readable medium of claim 15, further comprising computer-readable instructions for maintaining a centralized log of the registration of the computer.

* * * * *